(12) United States Patent
Bokor et al.

(10) Patent No.: US 9,782,709 B2
(45) Date of Patent: Oct. 10, 2017

(54) FILTER SYSTEM

(71) Applicant: BOKOR Manufacturing Inc., Blenheim (CA)

(72) Inventors: Ken Bokor, Blenheim (CA); Waguih Elmaraghy, London (CA); Abdo Al-Zaher, Windsor (CA)

(73) Assignee: Bokor Manufacturing Inc., Blenheim, ON (CA)

( * ) Notice: Subject to any disclaimer, the term of this patent is extended or adjusted under 35 U.S.C. 154(b) by 38 days.

(21) Appl. No.: 14/798,957

(22) Filed: Jul. 14, 2015

(65) Prior Publication Data

US 2016/0016460 A1    Jan. 21, 2016

Related U.S. Application Data

(60) Provisional application No. 62/024,752, filed on Jul. 15, 2014.

(51) Int. Cl.
| | | |
|---|---|---|
| *B01D 45/00* | (2006.01) | |
| *B01D 46/00* | (2006.01) | |
| *B01D 46/24* | (2006.01) | |

(52) U.S. Cl.
CPC ....... *B01D 46/002* (2013.01); *B01D 46/0002* (2013.01); *B01D 46/0026* (2013.01); *B01D 46/2411* (2013.01)

(58) Field of Classification Search
CPC ........ B01D 45/06; B01D 46/46; B01D 53/22; B01D 50/00; B60K 1/00
USPC ......... 55/385.3, DIG. 28, DIG. 30, 436, 498, 55/510; 123/198 E; 248/55, 58, 60, 62; 180/89.2, 309; 267/152, 165
See application file for complete search history.

(56) References Cited

U.S. PATENT DOCUMENTS

| | | | | |
|---|---|---|---|---|
| 4,093,038 A | * | 6/1978 | Molin | B60T 1/06 180/271 |
| 4,208,197 A | * | 6/1980 | Yakimowich | B01D 50/00 296/180.2 |
| 5,067,856 A | * | 11/1991 | Sisk | B60P 1/60 406/41 |
| 5,895,510 A | * | 4/1999 | Butler | B01D 46/2411 55/490 |
| 6,569,219 B1 | * | 5/2003 | Connor | B01D 46/2414 55/490 |
| 7,135,051 B2 | * | 11/2006 | Baldinger | A47L 5/24 15/347 |
| 7,217,361 B2 | * | 5/2007 | Connor | B01D 46/0005 123/198 E |
| 7,517,380 B2 | * | 4/2009 | Grimm | B01D 46/001 180/89.2 |
| 7,678,168 B2 | * | 3/2010 | Connelly | F16L 55/035 180/309 |

(Continued)

*Primary Examiner* — Duane Smith
*Assistant Examiner* — Minh-Chau Pham

(57) ABSTRACT

An air filter arrangement for use in a truck pneumatic product transfer system using a generally rectangular housing and two air filter cartridges to alter the shape thereof (primarily reduce the width thereof) allowing the unit to be mounted centrally behind a truck cab or in other locations. The design and shape allows mounting on the truck in preferred areas that are less utilized for accessory equipment and can increase truck aerodynamics. Additionally the filter arrangement can reduce overall truck weight compared to traditional units.

12 Claims, 8 Drawing Sheets

(56) References Cited

U.S. PATENT DOCUMENTS

| | | | |
|---|---|---|---|
| 8,105,407 B2* | 1/2012 | Taniguchi | F02M 35/0201 123/198 E |
| 8,702,849 B2* | 4/2014 | Matson | B01D 46/02 55/341.2 |
| 2005/0217222 A1* | 10/2005 | Hsu | A01D 34/82 55/385.1 |
| 2010/0050865 A1* | 3/2010 | Johnson | B01D 46/002 95/17 |

* cited by examiner

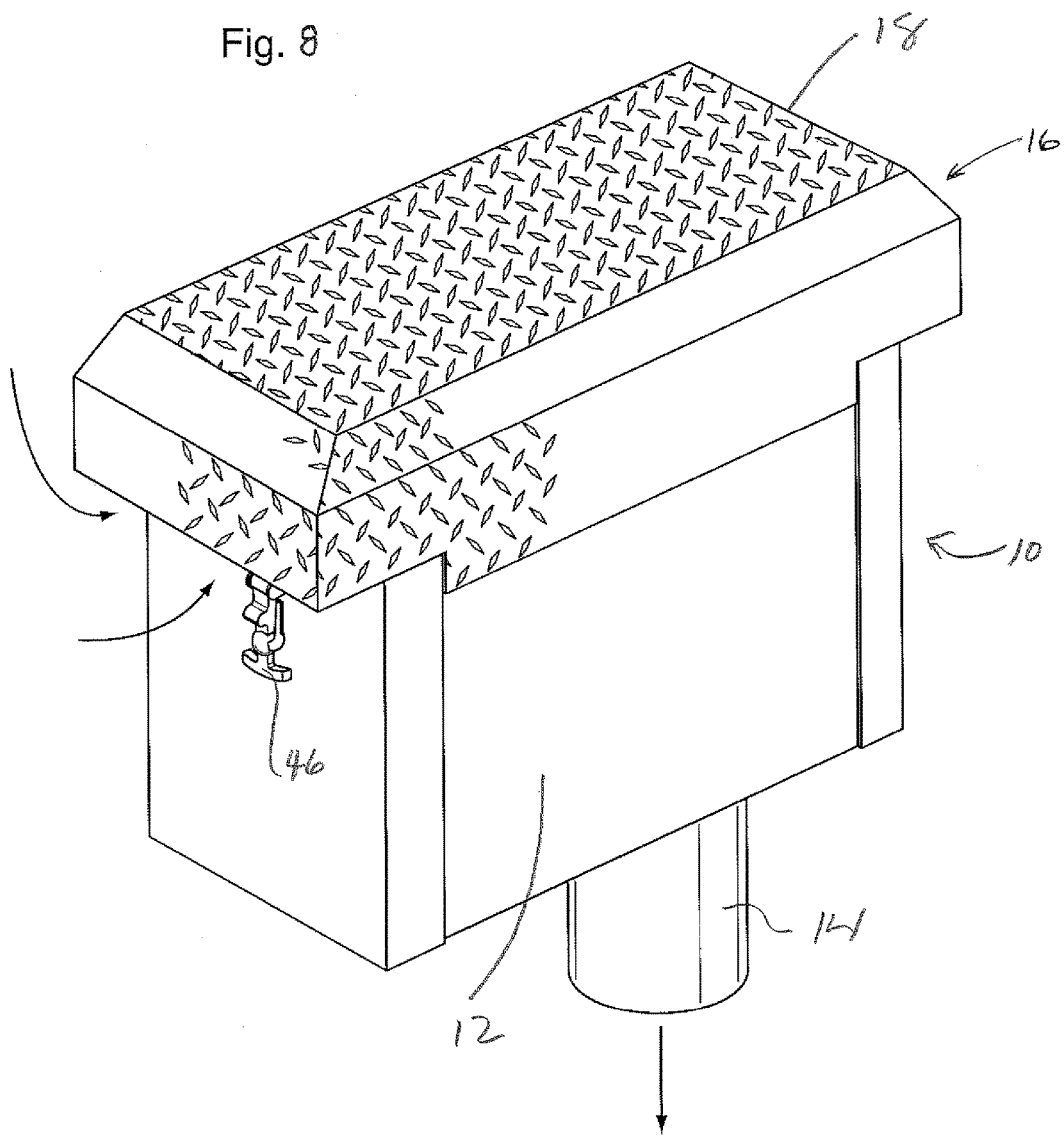

FILTER SYSTEM

This application claims priority from U.S. Provisional Application Ser. No. 62/024,752 entitled "FILTER SYSTEM" and filed on Jul. 15, 2014.

FIELD OF THE INVENTION

The present application relates to an air filter structure typically used as part of a pneumatic transfer system used by trucks to transfer dry bulk goods. In particular, the invention relates to an improved air filter structure used to filter air blower intake air.

BACKGROUND OF THE INVENTION

Transport type trailers designed for hauling dry bulk goods commonly include a pneumatic loading and off-loading system. The pneumatic system includes an air pump/blower and an air filter unit that are mounted on the outside of a frame rail of the truck tractor unit. Typically, the pump/blower includes a cooperating large diameter cylindrical air filter housing that provides filtered intake air to the pump/blower.

These truck pump/blowers are offered by a number of different manufacturers and are mounted on L-shaped brackets secured to an outside surface of a frame rail of the tractor. In some cases the pump/blower is mounted to the exterior of the frame rail on one side of the tractor and the filter unit is mounted on an opposite side of the tractor on the other frame rail. In some installations both the pump/blower and the filter housing are located on the same side of the tractor. The filter housing is typically a large cylindrical unit with air passing generally vertically through the filter unit.

Typically the pump/blower and the filter housing are positioned to overlap with the respective frame rail.

With tractor trailers, the amount of equipment carried by the tractor continues to increase and available mounting space has become limited. For example, wind panels or wind deflectors are often mounted to the frame rails of the tractor to improve fuel efficiency and fuel additive tanks are mounted on the outside of the frame rails and/or behind the tractor cab. In contrast to the traditional cylindrical filter unit having a large cylindrical filter cartridge housed therein, the present invention utilizes a different arrangement that is narrow in profile, non-circular, and designed to be more effectively mounted with the other equipment carried on a tractor trailer.

SUMMARY OF THE INVENTION

An air filter structure according to the present invention is used as part of a truck mounted pneumatic transfer system for dry bulk material. The air filter structure comprises an elongate housing and a removable cover. The removable cover is oversized relative to an upper support edge of the elongate housing and defines an air inlet between an upper edge of the housing and the removable cover. The air filter structure includes two removable air filters secured in a cavity of the housing and spaced in a length of the elongate housing with each air filter having an air outlet. The air filters cooperate with the elongate housing and the single air outlet port to define an air flow path between the air inlet and the air outlet port that passes through the air filters.

According to an aspect of the invention, the elongate housing includes a separating member traversing the elongate housing and forming an air outlet plenum in the elongate housing located below the separating member. The separating member includes two air filter mount arrangements located above air filter ports opening to the air outlet plenum. The air outlet port is located in the elongate housing and associated with the air outlet plenum and allows filtered air to pass out of the air outlet plenum.

In an aspect of the invention, the elongate housing is generally rectangular in shape having a depth of 10 to 12 inches, a length of 20 to 24 inches and of a height of at least about 17 inches.

According to a further aspect of the invention, the elongate housing and the removable cover are fabricated of a structural plate material capable of supporting a person's weight when standing on top of the lid allowing the air filter structure to act as support surface. Preferably the structural plate is made of an aluminum material.

In an aspect of the invention, rubber tension fasteners releasably secure the lid to the elongate housing. The rubber tension fasteners maintain the lid in an operating position covering the elongate housing.

According to an aspect of the invention, the lid includes a series of downwardly extending flanges positioned to cooperate with the upper edge of the elongate housing to align the removable cover in an operative position engaging the walls of the elongate housing.

In a further aspect of the invention, the downwardly extending flanges engage exterior surfaces of the elongate housing adjacent the upper edge.

In a different aspect of the invention, the removable cover includes an outer hood of a metal plate material, the outer hood includes a support plate secured to the outer hood. The support plate has a lip portion covering the upper edge of the elongate housing and extends inwardly of the upper edge. The support plate includes an elongate central port with an upwardly extending screen member positioned about the central port and structurally connecting the outer hood and the support plate. The screen member, the outer hood and the support plate cooperate to define an airflow path between an open gap between the outer hood and the elongate housing, through the screen member and into the elongate housing. Preferably, the support plate along a side edge includes an upwardly extending flange mechanically secured to a downwardly extending portion of said outer hood and forming a load transfer surface with a first side upper edge of said elongate housing. Preferably, the support plate includes a second side edge parallel to the first side edge. The support plate at the second side edge includes a series of space brackets connected to a downwardly extending side flange of the outer hood with an air inlet defined between the side flange of the outer hood and the support plate.

In yet a further embodiment of the invention, the air filters are mounted on an upper surface of an air outlet plenum and a downwardly extending air outlet port is located in a base portion of the elongate housing.

BRIEF DESCRIPTION OF THE DRAWINGS

Preferred embodiments of the invention are shown in the drawings, wherein:

FIG. 8 is a rear perspective view of the air filter structure.

DETAILED DESCRIPTION OF THE PREFERRED EMBODIMENTS

Figure 1:
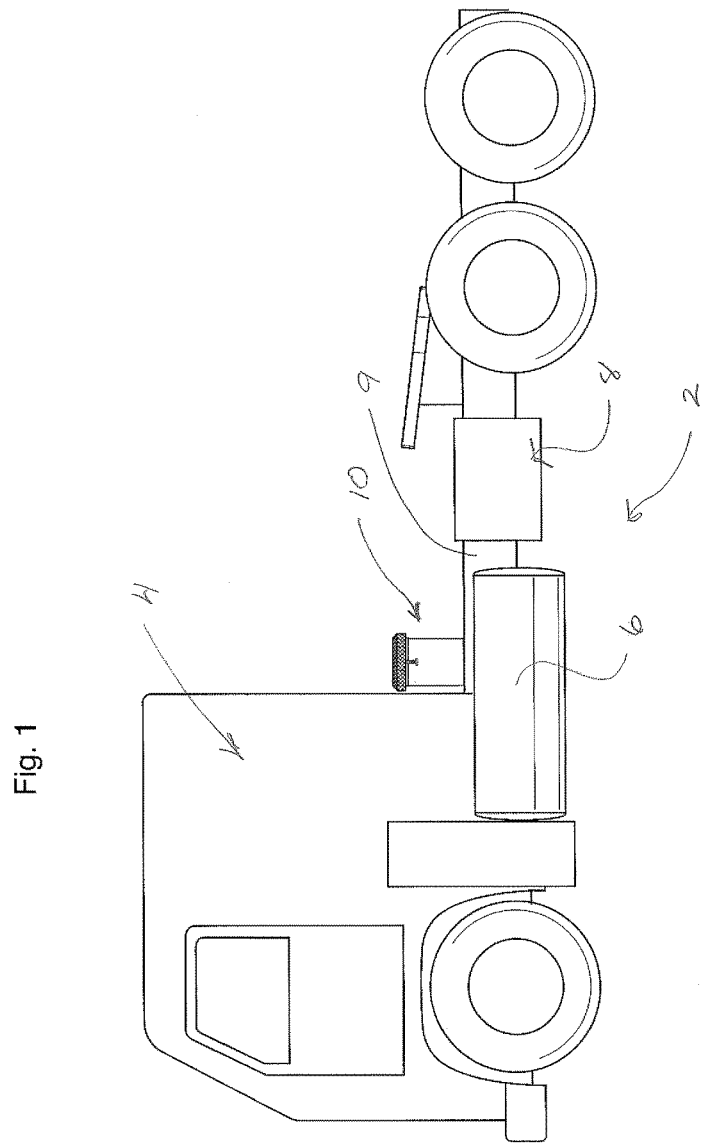
FIG. 1 is a side view of a truck tractor with the air filter structure located behind the cab.
Figure 2:
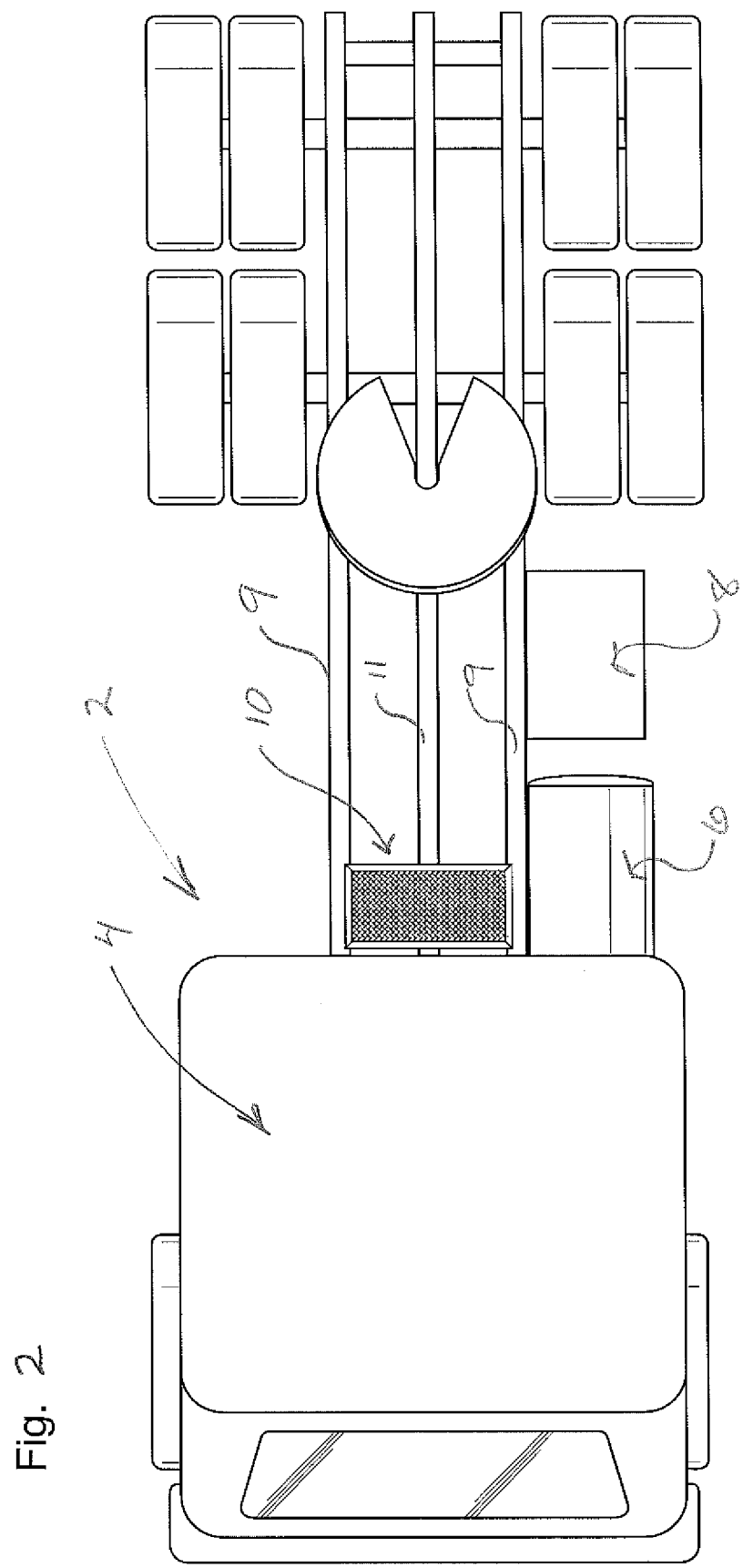
FIG. 2 is a top view of the truck tractor showing the air filer structure centrally located behind the tractor cab.

FIG. 1 shows the truck tractor 2 and the relative positions of the cab 4, a fuel tank 6 an air blower 8, a side rail 9 of the truck tractor, and the position of the air filter unit centrally behind the rear face of the cab. The top view of FIG. 2 shows the relative position of these components. It can be seen in the top view of FIG. 2 that the truck tractor 2 includes opposed side rails 9 as well as a central drive shaft 11.

The preferred positioning of the filter unit 10 behind the rear face of the cab 4 and generally centrally with respect to the width of the truck tractor is advantageous as the space immediately exterior of the side rails 9 is commonly used to mount a diverse arrangement of accessory components. For example, wind panels or wind deflectors are often mounted to the side rails 9 to improve fuel efficiency. Fuel additive tanks are mounted on the outside of the frame rails.

Traditional filter units for air blowers are of a cylindrical design. These traditional filter units have a large cylindrical cartridge housed therein and there is insufficient room to mount this type of filter unit behind the cab. These cylindrical filter units and air blowers are mounted to the exterior of the side rails (negatively impacting aerodynamics) and compete with many other components that are needed or commonly added to a truck tractor.

The design of the filter housing 10 and its suitability for mounting centrally behind the cab 4 (due to the elongate shape thereof) allows the air filter structure to be mounted in an area that is less frequently used and allows other components to be mounted to the exterior of the side rails. Although the central mounting location is preferred, the air filter unit can be mounted in traditional locations.

The air filter structure as will be further described is also designed to be placed in close proximity to the rear face of the cab while still allowing the cab and components associated therewith to be serviced. This protected position is more fuel efficient (does not negatively impact aerodynamic factors) and the filter housing is preferably made of a light weight material, such as aluminum to reduce the overall weight.

The filter unit 10 is used to filter air that is provided to the blower unit 8 as part of the truck pneumatic offloading system. The blower unit is typically secured to the exterior of one of the side rails 9 and includes a power input arrangement powered by the truck tractor. The filter unit 10, as will be further described, includes an output port 14 for connection to the blower unit 8 and straddles the frame rails 8 simplifying securement and reducing weight due to the simplified mounting structure.

Figure 3:
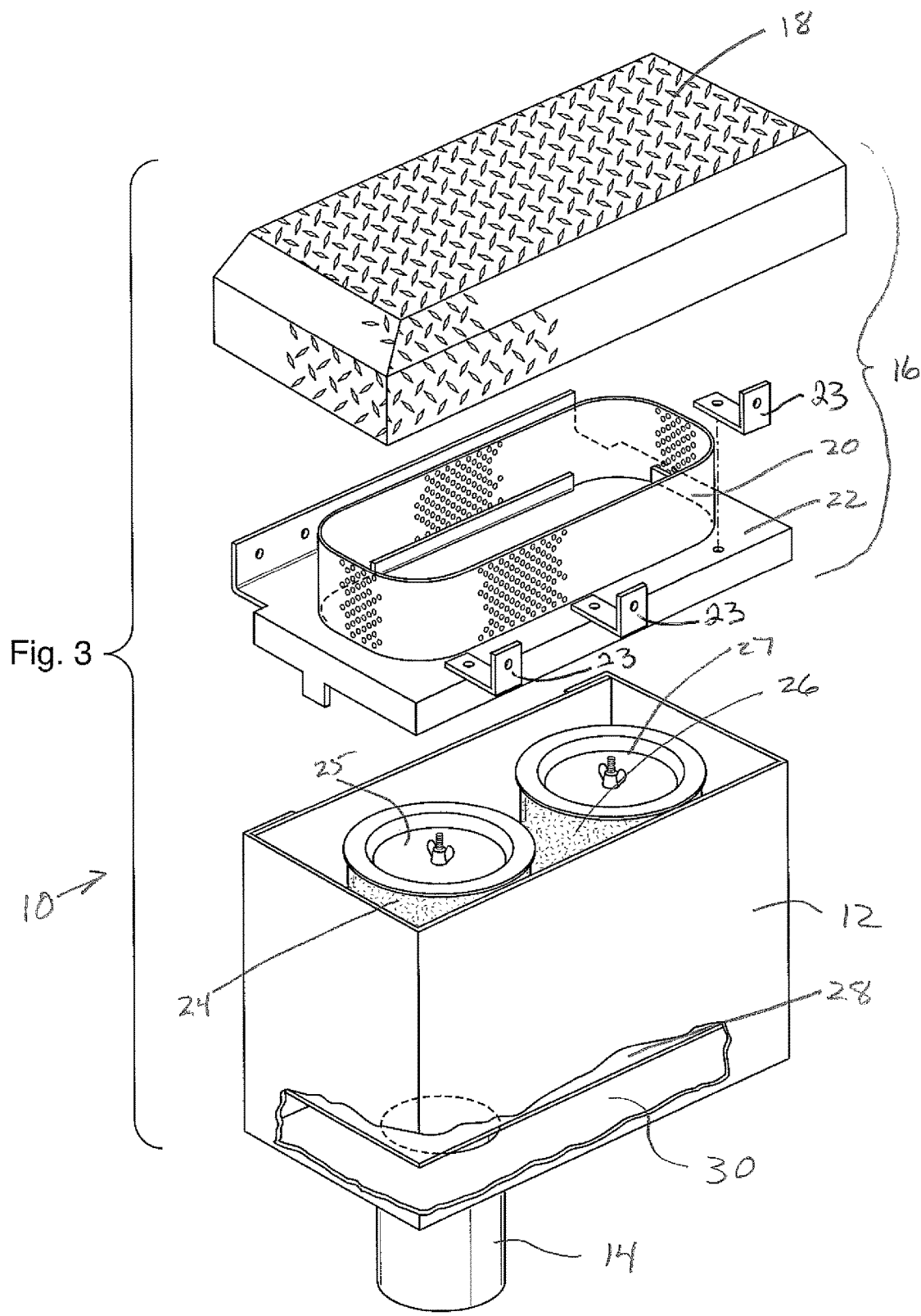
FIG. 3 is an exploded perspective view of the air filter structure and the various components.

As shown in FIG. 3, the filter unit 10 includes the filter housing 12 having mounted therein replaceable filter cartridges 24 and 26. Each of these filter cartridges include a top plate 25 and 27 respectively. These top plates are sometimes an integrated fixed component of the filter cartridge. A number of different arrangements can be provided for holding of the filter cartridges in place. These filter cartridges are supported on a false bottom identified as 28. With this arrangement air in the outlet plenum 30 passes out of the filter unit 10 and out to the blower unit through the outlet port 14.

The filter unit 10 includes the removable cover 16 made up of the hood 18, the screen filter ring 20 and the support bracket 22. Components 18 through 22 are preferably mechanically secured together to form an integrated component. The support bracket 22 includes three brackets 23 that mechanically connect the support bracket 22 to a side edge of the hood 18. With this arrangement the hood is mechanically attached to the support bracket on opposite sides of the filter unit 10. The top surface of the hood 18 is preferably textured and made of an aluminum material. With this arrangement the top surface of the hood forms a raised support surface behind the truck cab.

Figure 4:
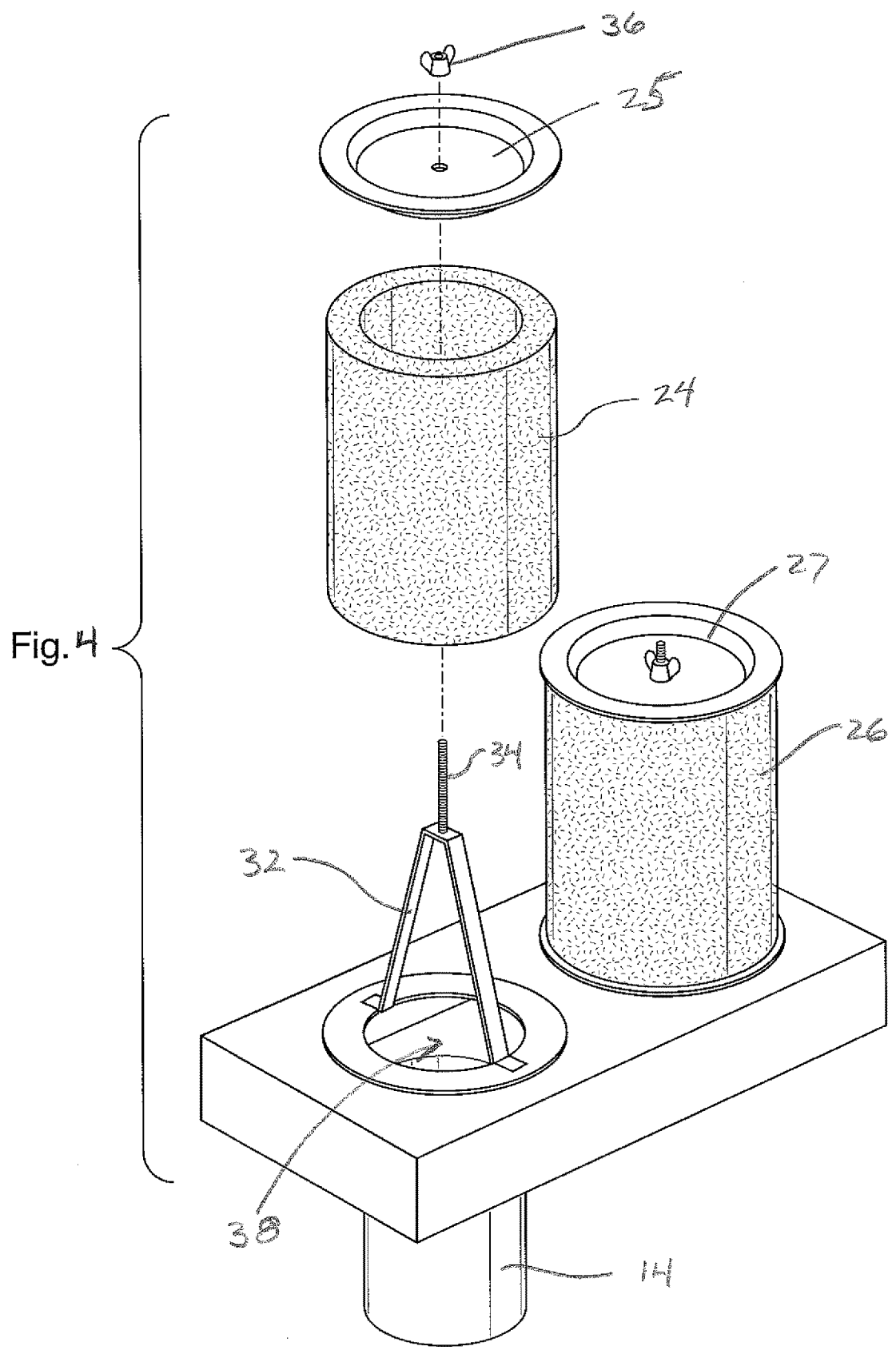
FIG. 4 is a partial exploded view showing interior components of the filter housing and the mounting of filter units.

In the exploded view of FIG. 4 the housing 12 has been removed to show the assembly of the replaceable filter cartridges 24 and 26 in the filter unit 10. The filter cartridge 24 can be inserted on the pedestal mount 32 which includes a projecting threaded rod 34. The threaded rod 34 cooperates with the top plate 25 and the wing nut 36 to secure the cartridge against the false bottom 28. There is a circular port 38 in the false bottom 28 and this port opens into the outlet plenum 30 in the base of the housing. A similar arrangement is provided with respect to the replaceable filter cartridge 26. In his way air can pass through each of the filter cartridges 24 and 26 and enter the outlet plenum 30 and eventually pass out the outlet port 14.

Figure 5:
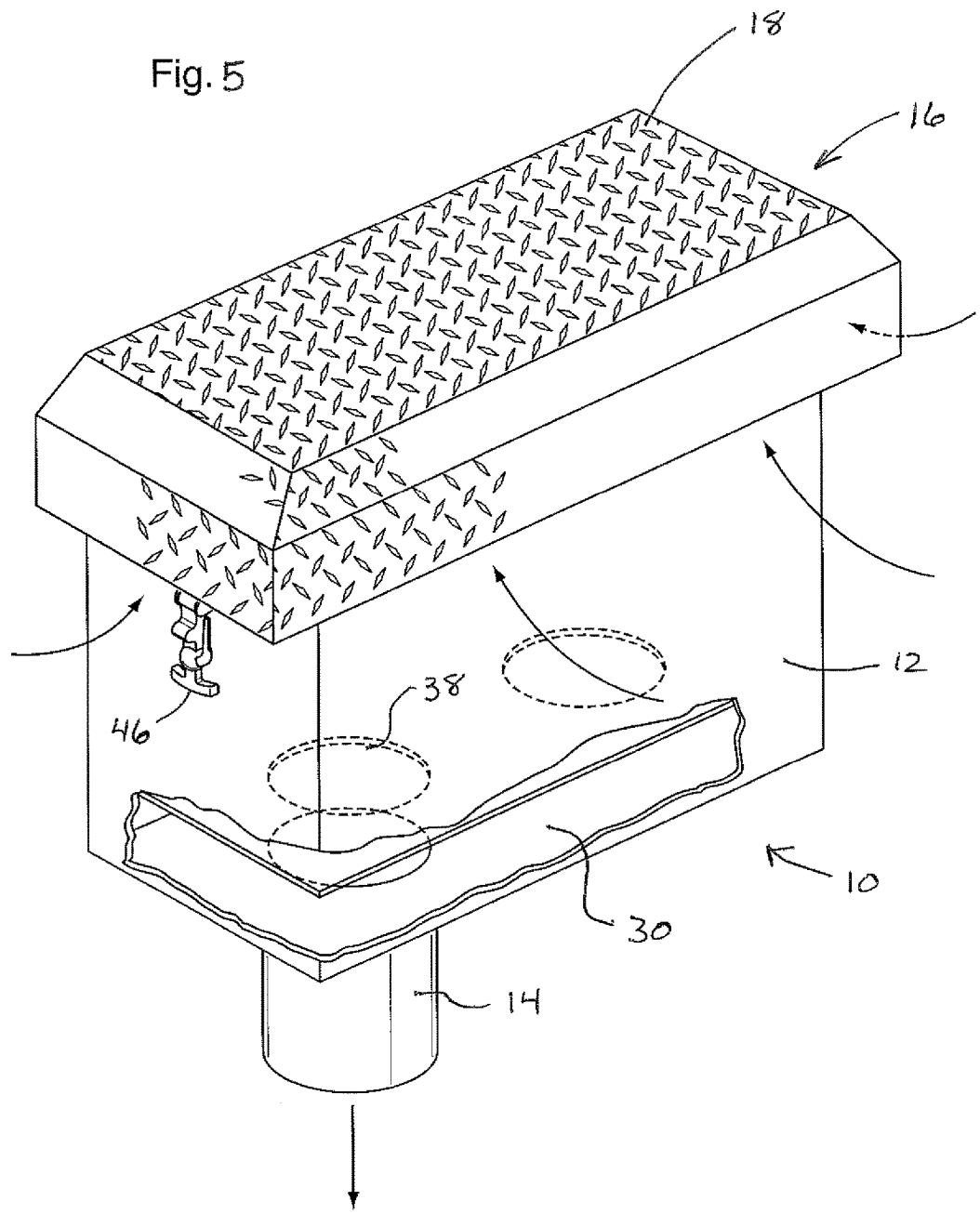
FIG. 5 is a partial cut-away of the assembled filtered housing with the filter units not shown for clarity.

In FIG. 5 it can be seen that the lid cover 16 is over sized on three of the sides to project beyond the side and end faces of the filter housing. In this way air can pass between the removable cover 16 through the screen filter ring 20 and into the filter housing 12. Thus the screen filter ring provides a first filtering of the air. This air has already been diverted from a generally upward direction to a horizontal direction and downwards. This will assist in separation of any material in the air.

It is preferable that the hood 18 not project or not appreciably project beyond one side face of the filter housing 12. Basically the side face of the removable cover 16 is essentially aligned with the front surface of the filter housing. The end view of FIG. 6 illustrates this arrangement and principle.

With this arrangement air can pass upwardly into the removable cover 16 through the screen filter ring 20 and pass downwardly into the filter housing 12. The filter cartridges are supported in the filter housing 12 and air can then pass through those filter cartridges providing filtered air for the blower unit 8.

With this arrangement the filter unit is provided with two replaceable filter cartridges 24 and 26 allowing the filter unit to be of a generally rectangular configuration and located across the rails of the truck tractor in a generally central location. The use of two filters allows each filter to be of a significantly reduced diameter relative to the larder diameter and height of the single filter cartridge used in existing systems.

Figure 6:
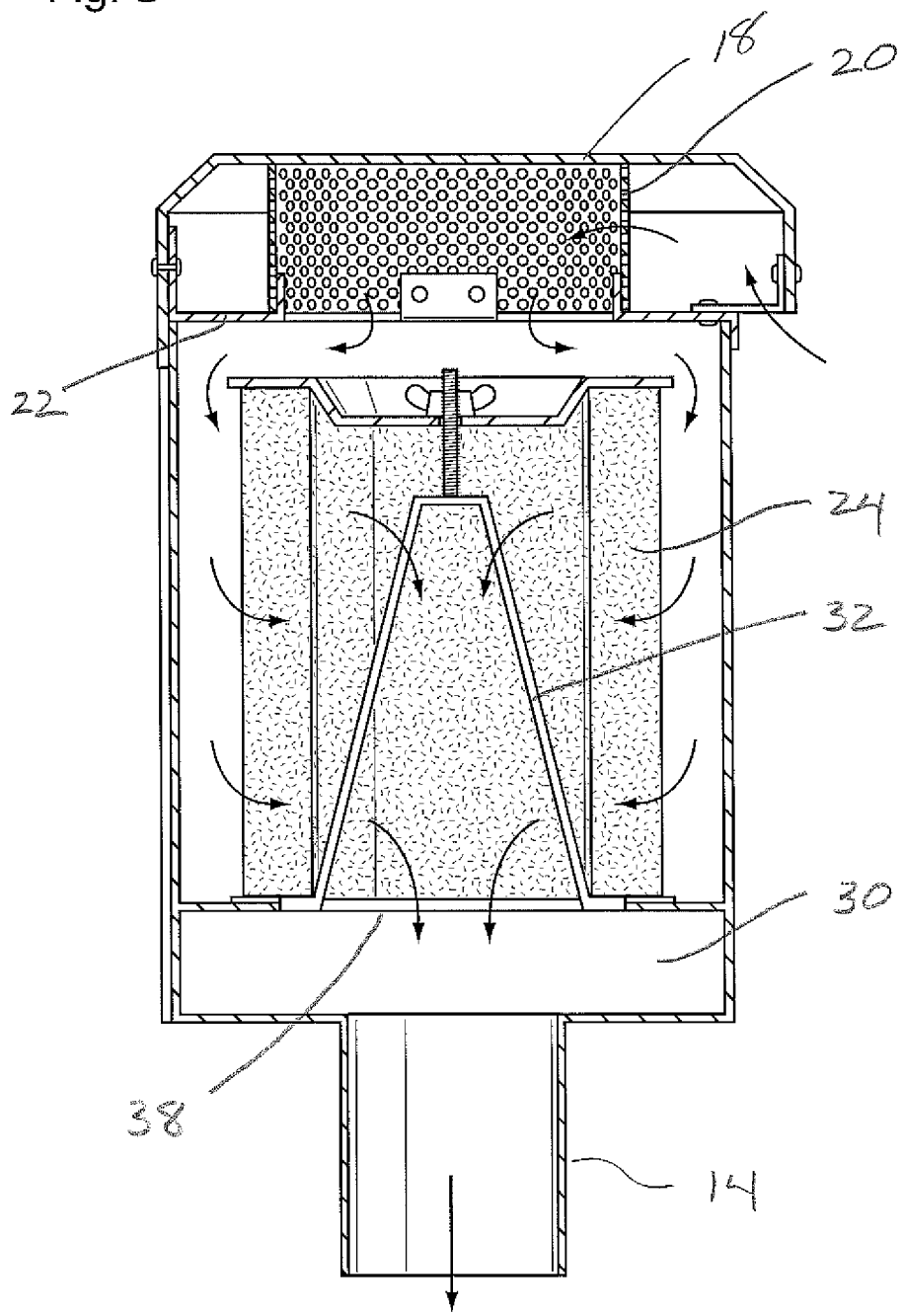
FIG. 6 is a cross-sectional view through the air filter structure showing the air flow.

In FIG. 6 it can be seen that air passes through a gap between the removable cover 16 and the filter housing 12 and then passes downwardly before being presented to the replaceable filter cartridges. Air can pass through the filter cartridges and is discharged centrally of the filter cartridge into the air output plenum 30. The air output plenum 30 is appropriately connected to the blower unit via an outlet port 14.

The screen filter ring 20 not only provides an initial coarse filtering of air, it also provides a mechanical structural member spacing the hood cover 18 from the support bracket 22. When a person stands on the hood cover 18 some of the load is transferred through the screen filter ring 20 to the support bracket 22 and to the top edges of the filter housing 12. The replaceable air filter cartridges are located below the upper edge of the filter housing 12.

Figure 7:
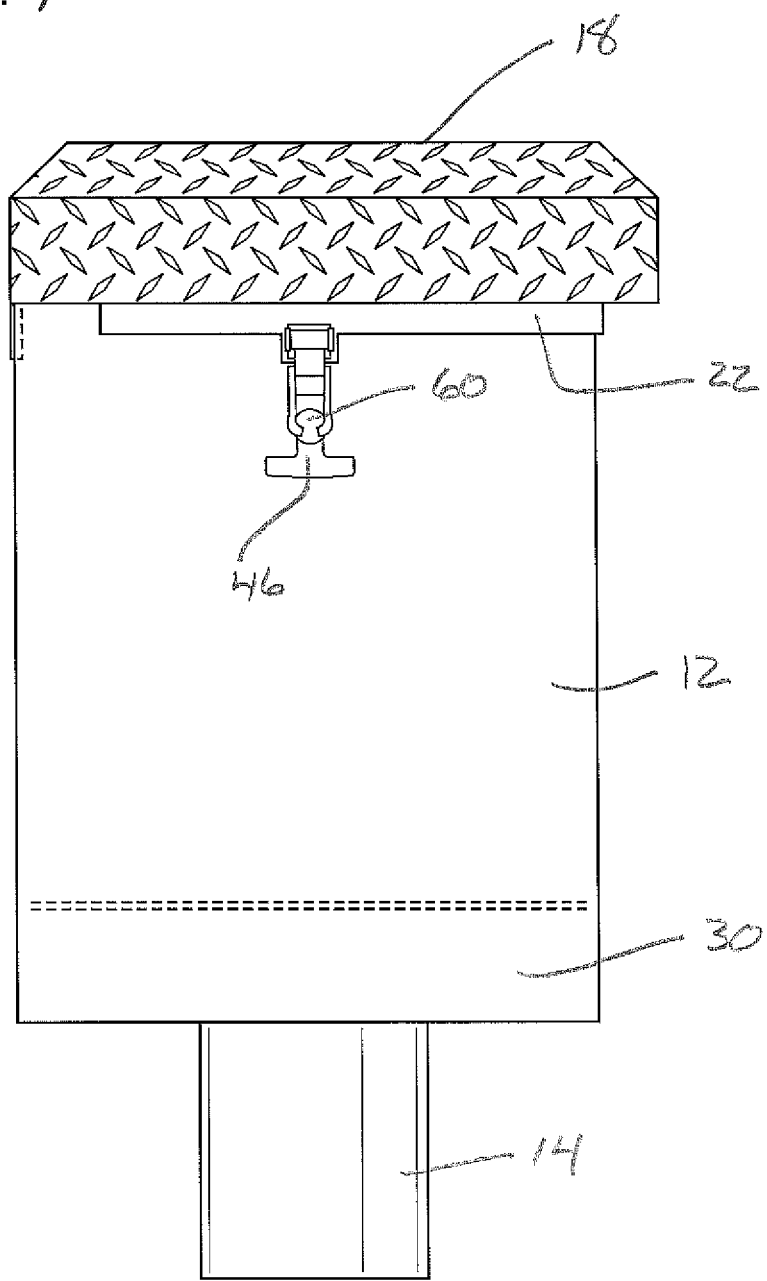
FIG. 7 is an end view of the air filter structure showing the releasable hood securement.

FIG. 7 shows a preferred elastic type tensioning member used to secure the hood 16 to the filter housing 12. The hood 16 carries a rubber elastic member 46 that is stretched and locked below a fixed latch 60. This fixed latch is secured to the filter housing 12. In this way a tensioning force is maintained on the hood 16 to maintain its position covering and effectively protecting the filter housing 12. Additional details of the latch can be seen in FIG. 5. As shown, the fixed latch 60 is mounted on the side of the housing and the elastic member 46 engages and is retained on. This type of connection is often used with respect to truck hoods and other components. It maintains tension and provides reliable releasable securement. Other releasable securing mechanisms can be used.

Preferably, the filter housing is generally rectilinear in shape with a depth of about 12 inches, a length of less than 24 inches (preferably 22 inches) and a height of 20 inches or less.

The filter unit can also filter air provided to a pump unit with some adaption to allow a pump suction to connect to the bulk storage container on the trailer to assist in dry bulk material loading.

FIG. 8 is a rear perspective view of the filter unit 10 showing the relationship of the filter housing 12 and the hood 16.

Although various preferred embodiments of the present invention have been described herein in detail, it will be appreciated by those skilled in the art, that variations may be made thereto without departing from the scope of the appended claims.

The embodiments of the invention in which an exclusive property or privilege is claimed are defined as follows:

1. In a truck mounted bulk material pneumatic transfer system for transfer of dry bulk material, an air filter structure comprising:
    an elongate housing and a removable cover,
    said removable cover being oversized relative to an upper support edge of said elongate housing and defining an air inlet between an upper edge of said housing and said removable cover;
    said air filter structure including two removable air filters secured in a cavity of said housing and spaced in a length of said elongate housing with each air filter having an air outlet;
    said air filters cooperating with said elongate housing and said air outlet to define an air flow path between said air inlet and said air outlet port that passes through said air filters.

2. In a truck mounted bulk material pneumatic transfer system for transfer of dry bulk material and an air filter structure as claimed in claim 1 wherein said elongate housing includes a separating member traversing said elongate housing and forming an air outlet plenum in said elongate housing located below said separating member; said separating member including two air filter mount arrangements located about air filter ports opening to said air outlet plenum;
    said air outlet port being provided in said elongate housing and associated said air outlet plenum and allowing filtered air to pass out of said air outlet plenum.

3. In a truck mounted bulk material pneumatic transfer system for transfer of dry bulk material and an air filter structure as claimed in claim 1 wherein said elongate housing is generally rectangular in shape having a depth of 10 to 12 inches, a length of 20 to 24 inches and of a height of at least about 17 inches.

4. In a truck mounted bulk material pneumatic transfer system for transfer of dry bulk material and an air filter structure as claimed in claim 1 wherein said elongate housing and said removable cover are fabricated of a structural plate material capable of supporting a person's weight when standing on top of said lid allowing said air filter structure to act as support surface.

5. In a truck mounted bulk material pneumatic transfer system for transfer of dry bulk material and an air filter structure as claimed in claim 4 wherein said structural plate is made of an aluminum material.

6. In a truck mounted bulk material pneumatic transfer system for transfer of dry bulk material and an air filter structure as claimed in claim 1 including elastic tension fasteners releasably securing said lid to said elongate housing, said elastic tension fasteners maintaining said lid in a position covering said elongate housing.

7. In a truck mounted bulk material pneumatic transfer system for transfer of dry bulk material and an air filter structure as claimed in claim 6 said lid includes a series of downwardly extending flanges positioned to cooperate with said upper edge of said elongate housing to align said removable cover in an operative position engaging the walls of said elongate housing.

8. In a truck mounted bulk material pneumatic transfer system for transfer of dry bulk material and an air filter structure as claimed in claim 7 wherein said downwardly extending flanges engage exterior surfaces of said elongate housing adjacent said upper edge.

9. In a truck mounted bulk material pneumatic transfer system for transfer of dry bulk material and an air filter structure as claimed in claim 1 wherein removable cover includes an outer hood of a metal plate material, said outer hood including a support plate secured to said outer hood and having a lip portion covering the upper edge of said elongate housing and extending inwardly of said upper edge;
    said support plate including an elongate central port through said support plate with an upwardly extending screen member positioned about said central port and structurally connecting said outer hood and said support plate;
    said screen member, said outer hood and said support plate cooperating to define an airflow path between an open gap between said outer hood and said elongate housing, through said screen member and into said elongate housing.

10. In a truck mounted bulk material pneumatic transfer system for transfer of dry bulk material and an air filter structure as claimed in claim 9 wherein said support plate along a side edge includes an upwardly extending flange mechanically secured to a downwardly extending portion of said outer hood and forming a load transfer surface with a first side upper edge of said elongate housing.

11. In a truck mounted bulk material pneumatic transfer system for transfer of dry bulk material and an air filter structure as claimed in claim 10 wherein said support plate includes a second side edge parallel to said first side edge, said second side edge including a downwardly extending flange immediately adjacent a side edge of said housing with said support plate engaging and closing an upper edge of a side of said housing;

said support plate at said second side edge including a series of space brackets connected to a downwardly extending side flange of said outer hood with an air inlet defined between said side flange of said outer hood and said support plate.

12. In a truck mounted bulk material pneumatic transfer system for transfer of dry bulk material and an air filter structure as claimed in claim 10 wherein said air filters are mounted on an upper surface of an air outlet plenum and a downwardly extending air outlet port is located in a base member of said elongate housing and cooperating with said air outlet plenum to form an air outlet of said air filter structure.

* * * * *